United States Patent [19]
Carter et al.

[11] Patent Number: 6,097,773
[45] Date of Patent: Aug. 1, 2000

[54] CO-CHANNEL INTERFERENCE REDUCTION

[75] Inventors: Alan J. A. Carter, Ottawa; Derek Hilborn, Nepean; Norman P. Secord, Ottawa, all of Canada

[73] Assignee: Nortel Networks Limited, Montreal, Canada

[21] Appl. No.: 08/919,281

[22] Filed: Aug. 28, 1997

Related U.S. Application Data

[60] Provisional application No. 60/047,419, May 22, 1997.

[51] Int. Cl.$^7$ .................................................. H04B 7/10
[52] U.S. Cl. ..................... 375/347; 375/349; 455/132; 455/137; 455/273
[58] Field of Search ..................................... 375/347, 349; 455/132, 137, 139, 63, 67.3, 138, 273, 276.1

[56] References Cited

U.S. PATENT DOCUMENTS

| | | | |
|---|---|---|---|
| 4,989,262 | 1/1991 | Saito | 455/138 |
| 5,204,979 | 4/1993 | Schenkyr et al. | 455/276.1 |
| 5,321,850 | 6/1994 | Backstrom et al. | 455/139 |
| 5,481,570 | 1/1996 | Winters | 375/347 |
| 5,752,173 | 5/1998 | Tsujimoto | 455/137 |
| 5,778,310 | 6/1998 | Tong et al. | 455/306 |
| 5,838,742 | 11/1998 | Abu-Dayya | 375/347 |
| 5,875,216 | 2/1999 | Martin | 375/347 |
| 5,896,424 | 4/1999 | Uchida et al. | 375/346 |
| 5,960,039 | 12/1999 | Martin et al. | 375/267 |
| 6,006,110 | 12/1999 | Raleigh | 455/561 |

*Primary Examiner*—Stephen Chin
*Assistant Examiner*—Dac V. Ha

[57] ABSTRACT

Co-channel interference in an AMPS (Advanced Mobile Phone System) receiver, having at least two diversity paths each for producing a received signal, is reduced by determining weights for combining the received signals in dependence upon the received signals and a reference signal, combining the received signals in accordance with the determined weights to produce a combined received signal, demodulating the combined received signal, and producing the reference signal by amplitude limiting the combined received signal or modulating the demodulated signal or a signal derived from the demodulated signal, so that the reference signal is produced from the combined received signal with amplitude variations reduced and with frequency variations of the desired signal substantially maintained.

10 Claims, 1 Drawing Sheet

CO-CHANNEL INTERFERENCE REDUCTION

This application claims the benefit of United States Provisional Application No. 60/047,419 filed May 22, 1997.

This invention relates to reduction of co-channel interference in communications systems using frequency modulation (FM), perticularly AMPS (Advanced Mobile Phone System) cellular radio or wireless communications systems.

BACKGROUND OF THE INVENTION

Co-channel interference (CCI) is constituted by one or more interfering signals within the frequency band of a desired signal in a communications system, and is a key factor that limits the capacity of cellular communications systems. The CCI can arise from communications in the same frequency channel in other cells of the system, or from other sources, so that its characteristics may be either similar to or different from those of the desired signal.

In International patent application No. PCT/CA96/00849 filed Dec. 18, 1996 in the name of Northern Telecom Limited (and in the corresponding U.S. patent application Ser. No. 08/730,828 filed Oct. 17, 1996 in the name of A. Abu-Dayya) entitled "Diversity Path Co-Channel Interference Reduction" there is described an arrangement in which diversity path signals, each comprising time division multiplexed (TDM) symbols in a time slot including known symbols, are combined with respective weights to reduce CCI. Such an arrangement is particularly applicable to TDMA (time division multiple access) cellular communications systems, in which the known symbols can for example comprise synchronization symbols. However, as AMPS systems are analog systems which do not use TDM and TDMA, and there are no known symbols such as synchronization symbols in time slots, such an arrangement can not be used for AMPS systems.

International patent application No. PCT/US93/00635, published as International Publication Number WO 93/19526 dated Sep. 30, 1993, entitled "Method And Apparatus For Estimating Signal Weighting Parameters In A Diversity Receiver" discloses a diversity combining receiver in which decoded data is re-encoded and the re-encoded data, and known data for example in a TDMA system, is used to determine new diversity weighting parameters, this process possibly being iterated.

It is also known from International patent application No. PCT/CA96/00672 in the name of W. Tong et al., published as International Publication Number WO 97/14227 dated Apr. 17, 1997, entitled "Co-Channel Interference Reduction", to reduce CCI in a cellular communications system using frequency modulation, such as AMPS, AMPS_WD (Wide-band Data AMPS), and TDMA systems, by amplitude limiting complex signal samples of a received signal.

An object of this invention is to provide an improved method and apparatus for reducing CCI, applicable in an AMPS receiver.

SUMMARY OF THE INVENTION

One aspect of this invention provides a method of reducing co-channel interference in a receiver having at least two diversity paths each for producing a received signal, comprising the steps of: determining weights for combining the received signals in dependence upon the received signals and a reference signal; combining the received signals in accordance with the determined weights to produce a combined received signal; demodulating the combined received signal; and producing the reference signal by one or more of the steps of amplitude limiting the combined received signal, modulating the demodulated signal and/or a signal derived from the demodulated signal, and otherwise deriving or recreating the reference signal from the combined received signal with amplitude variations reduced and preferably with frequency variations of the desired signal substantially maintained.

The step of producing the reference signal can comprise amplitude limiting the combined received signal, modulating the demodulated signal, or filtering the demodulated signal to produce a filtered signal and modulating the filtered signal. In the latter case the step of filtering the demodulated signal preferably comprises the steps of producing a first signal having reduced signal components in a predetermined frequency band, producing a second signal having signal components only in a narrow frequency band within the predetermined frequency band and identifying a desired received signal, and combining the first and second signals to produce the filtered signal. In this case the step of producing the second signal can comprise frequency tracking said signal components identifying the desired received signal, and the method can conveniently include the step of monitoring energy of said signal components identifying the desired received signal.

Another aspect of this invention provides apparatus comprising: a receiver having at least two diversity paths each for producing a frequency modulated received signal; a weight calculation unit for determining weights for combining the received signals in dependence upon the received signals and a reference signal; a signal combiner for combining the received signals in accordance with the determined weights to produce a combined received signal; a demodulator for demodulating the combined received signal to produce a demodulated signal; and means for reducing amplitude variations of the combined received signal to produce the reference signal.

The means for reducing amplitude variations of the combined received signal to produce the reference signal can comprise an amplitude limiter, or a modulator for frequency modulating the demodulated signal, or a filter for filtering the demodulated signal to produce a filtered signal and a modulator for frequency modulating the filtered signal to produce the reference signal.

BRIEF DESCRIPTION OF THE DRAWINGS

The invention will be further understood from the following description with reference to the accompanying drawings, in which.

DETAILED DESCRIPTION

Figure 1:
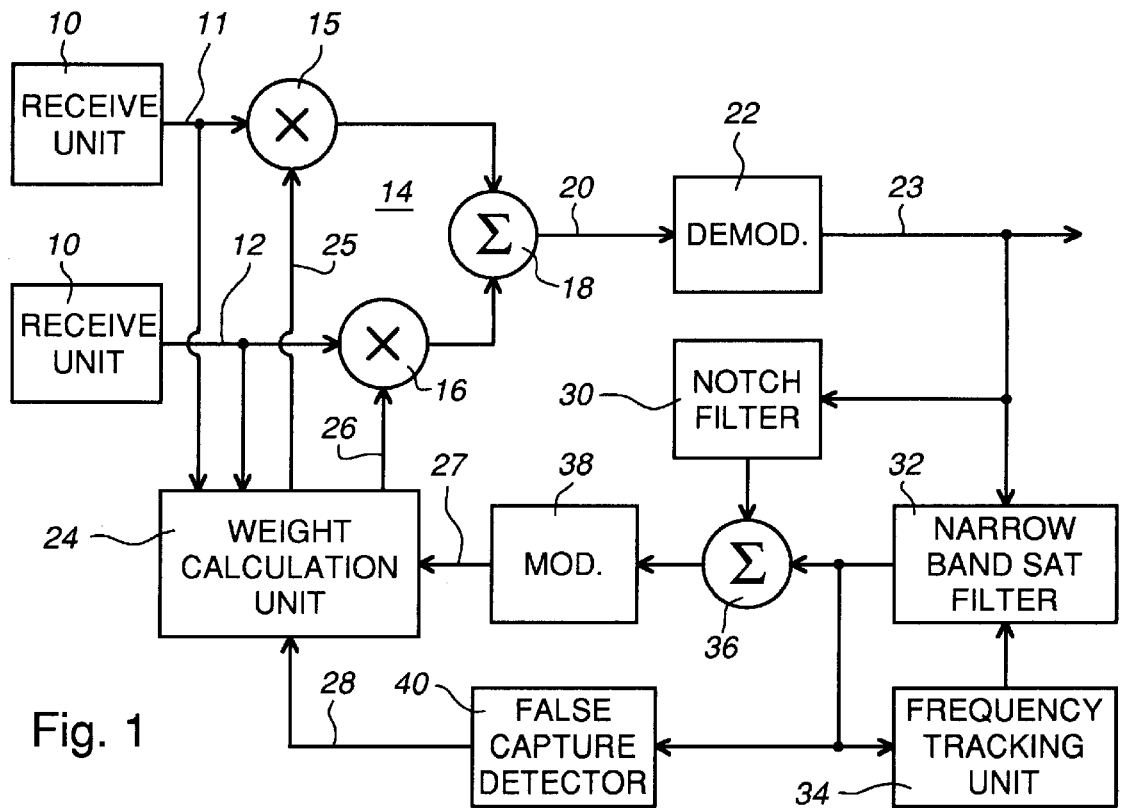
FIG. 1 schematically illustrates a block diagram of parts of an AMPS diversity receiver in accordance with an embodiment of this invention.

Referring to FIG. 1, a block diagram illustrates parts of an AMPS cellular radio communications receiver having in this case two diversity paths each including a respective antenna (not shown) and receive unit 10 providing a respective one of two digital diversity path sampled complex signals $x_1(t)$ and $x_2(t)$ on lines 11 and 12 respectively. Each receive unit 10 for example includes, as is known in the art, an RF (radio frequency) receiver and a digital unit comprising a sampler and analog-digital converter, and a digital receive filter, and together with subsequent functions of the receiver can be constituted by functions of one or more digital signal processor (DSP) integrated circuits. The two antennas are physically spaced apart to provide two diversity paths. More than two diversity paths can be provided, and their signals can be combined, in a similar manner, but for clarity and simplicity it is assumed here that there are only two diversity paths as shown in FIG. 1.

The signals on the lines 11 and 12 are weighted and combined in a CCI reducer or canceller (CCIC) 14 to produce on a line 20 an optimum received signal r(t) which is supplied to an FM demodulator 22 to produce an audio (voice and tones) signal output on a line 23. The CCIC 14 comprises complex signal multipliers 15 and 16, a summing unit 18, and a weight calculation unit 24. The unit 24 is supplied with the signals $x_1(t)$ and $x_2(t)$ from the lines 11 and 12 and, as described below, serves to produce weights $w_1$ and $w_2$ on lines 25 and 26 respectively. The multipliers 15 and 16 are supplied with the signals $x_1(t)$ and $x_2(t)$ from the lines 11 and 12 respectively, and with the weights $w_1$ and $w_2$ from the lines 25 and 26 respectively; products of these signals are supplied to and added by the summing unit 18 to produce the signal r(t).

As so far described, the receiver of FIG. 1 corresponds to a conventional diversity path receiver. For optimum CCI reduction by the CCIC 14 it is necessary to minimize the mean-squared error (MSE) at the output of the demodulator 22, or equivalently to maximize the SINR at the output of the CCIC 14. The weights $w_1$ and $w_2$ must be determined to this end. If the diversity path signals $x_1(t)$ and $x_2(t)$ on the lines 11 and 12 35 are denoted by a vector X(t), i.e. if:

$$X(t)=[x_1(t)\ x_2(t)]^T \quad (1)$$

where the superscript T denotes transpose, then it can be shown that the set of weights that minimizes the MSE at the output of the demodulator 22 (or maximizes the SINR at the output of the CCIC 14) is given by:

$$W(t) = \begin{bmatrix} w_1(t) \\ w_2(t) \end{bmatrix} = R_{xx}^{-1}(t) r_{xd}(t) \quad (2)$$

where $R_{xx}$ represents the correlation matrix of the received signals and $r_{xd}$ represents the reference signal correlation vector. These are given by the equations:

$$R_{xx}(t)=E[X(t)\ X^{*T}(t)] \quad (3)$$

$$r_{xd}(t)=E[X(t)\ d^*(t)] \quad (4)$$

where E[.] denotes expectation, $X^{*T}(t)$ is the transpose of the complex conjugate of X(t) (* represents conjugation), and d(t) is a reference signal that is correlated with the desired signal.

It can be seen, therefore, that optimum weights $w_1$ and $w_2$, constituting the set of W(t), can be determined by the weight calculation unit 24 if this is provided with a suitable reference signal. In a TDMA system, such a reference signal can be constituted by known symbols, such as synchronization symbols, in each TDM time slot. However, in an AMPS system as described here there are no such known symbols. The further parts of the receiver of FIG. 1 serve to derive and produce on a line 27 a reference signal for use by the weight calculation unit 24 to determine optimum weights, and optionally also to produce on a line 28 a false capture detection signal for use by the weight calculation unit 24 in particular circumstances, as further described below.

As is known, an AMPS voice channel has a bandwidth of 30 kHz and carries a constant (amplitude) envelope FM signal which comprises a voice signal with a modulation frequency in the range from 300 to 3400 Hz and a supervisory audio tone (SAT) with a modulation frequency around 6 kHz, and can also include a signalling tone (ST) with a modulation frequency of 10 kHz. The peak deviation, or range of frequency change, of these modulating signals, and of wide-band data which can also be carried by the voice channel, is typically 8 kHz or less. The sampling rate is 48.6 kHz.

More specifically, the SAT has one of three possible nominal frequencies: 5970, 6000, or 6030 Hz. The particular one of these three frequencies that is used is determined for each cell of the cellular system, and hence can be known by the receiver in each cell. The cellular system is arranged so that any significant CCI in the same frequency channel as the desired signal will have a different one of the three SAT frequencies, or (e.g. if it has a different source) will have no SAT.

The further parts of the receiver of FIG. 1 that serve to produce the reference signal on the line 27 comprise a notch (band-stop) filter 30, a narrow-band SAT frequency tracking filter, which as illustrated in FIG. 1 is constituted by a narrow-band SAT filter 32 and a frequency tracking unit 34, a summing unit 36, and a frequency modulator 38. The audio output of the demodulator 22 on the line 23 is supplied to the filters 30 and 32, whose outputs are combined by the summing unit 36. The combined output of the summing unit 36 is supplied to and frequency modulated by the modulator 38 to produce the reference signal on the line 27.

The notch filter has a stop band with a center frequency of 6 kHz and a width sufficient to remove any of the three SAT frequencies that may be present, regardless of whether these are associated with the desired signal or with CCI. The SAT filter 32 has a narrow bandwidth, for example of about 3 to 5 Hz, which is centered on the SAT frequency of the desired signal (as determined for the cell in which the receiver is located) so that it passes to its output only that SAT frequency. The frequency tracking unit 34 is supplied with the output of the filter 32, and supplies a control signal to the filter 32 to form in known manner a closed loop for maintaining the narrow bandwidth of the filter 32 centered on the actual SAT frequency of the desired AMPS signal. Thus the unit 34 tracks variations in the actual SAT frequency from the respective one of the three nominal frequencies identified above, and controls the center frequency of the filter 32 accordingly. Such variations can be up to about ±10 Hz.

Consequently, the signal produced at the output of the summing unit 36 has the same characteristics as the demodulated output signal on the line 23, except that any mixture of desired signal SAT and CCI SAT frequencies in the demodulated output signal is replaced in the signal at the output of the summing unit 36 by only the narrow-band filtered SAT frequency of the desired signal. This is frequency modulated by the modulator 38 to produce the reference signal on the line 27 with a good correlation with the actual desired signal, so that the reference signal can be reliably used by the weight calculation unit 24 to produce the weights $w_1$ and $w_2$. Details of this weight calculation are further described below.

The frequency tracking unit 34 can have any desired form. For example, the unit 34 can transform the output of the SAT filter 32 to a complex signal z(n) via a Hilbert transformer, and can calculate a single delay complex auto-correlation $R_{zz}(1)$ of this complex signal over a window of N samples in accordance with the equation:

$$R_{zz}(1) = \frac{1}{N-1} \sum_{n=1}^{N-1} z(n+1) z^*(n) \quad (5)$$

the argument $\omega_m$ of which constitutes an estimate of the mean SAT frequency in accordance with the equation:

$$\omega_m = \angle R_{zz}(1) \quad (6)$$

The value of N can be selected for example to correspond to a window period of 250 ms or more.

It can be appreciated that the narrow-band SAT filter 32 and the frequency tracking unit 34 as described above together constitute a narrow band frequency tracking filter for the SAT frequency of the desired signal. The particular units described above and illustrated in FIG. 1 can be replaced by any other desired form of narrow band frequency tracking filter. For example, such a filter could instead be constituted by a numerically controlled oscillator in a phase locked loop, driven from the output of the demodulator 22.

The combination of the demodulator 22 and the modulator 38 in the feedback loop which produces the reference signal on the line 27 in the receiver of FIG. 1 serves to remove amplitude fluctuations of the received signal caused by channel fading. In addition, the demodulator 22 and modulator 38 act as an amplitude limiter which captures and enhances the received signal component having the greatest power; generally this is the desired signal, because the CCI component of the received signal generally originates from a source more distant from the receiver than the desired signal. The demodulator 22 and modulator 38 thus assist in ensuring that the reference signal on the line 27 has a reduced interference component and is relatively free of amplitude channel fading impairments. In addition, the combination of the demodulator 22 and modulator 38 results in frequency errors in the desired signal, such as carrier frequency offset, SAT frequency errors, and frequency variations, being accurately recreated in the reference signal on the line 27. This is important in providing the reference signal with high fidelity.

The weight calculation unit 24 uses a finite number of samples WL to approximate the correlation matrix $R_{xx}$ and the reference signal correlation vector $r_{xd}$. In other words, the correlation matrix is approximated by:

$$R_{xx} = \sum_{k=1}^{WL} X(k) X^{*T}(k) \quad (7)$$

and the reference signal correlation vector is approximated by:

$$r_{xd} = \sum_{k=1}^{WL} X(k) d^*(k) \quad (8)$$

The optimum set of weights W is then determined from the correlation matrix $R_{xx}$ and the reference signal correlation vector $r_{xd}$ in accordance with equation (2). For the case of two diversity paths and hence two weights $w_1$ and $w_2$ described here, direct matrix inversion (DMI) is preferred to determine the weights $w_1$ and $w_2$ because the correlation matrix $R_{xx}$ is a 2 by 2 matrix for which DMI involves very little computation. DMI also has an advantage of faster convergence, and less sensitivity to powers of desired and interfering signals, than other known techniques, such as least mean squared (LMS) error estimation of the weights. However, for larger numbers of diversity paths, for example for 4 or more diversity paths, the LMS technique involves less computation than, and may be preferred over, DMI.

The window size WL is selected as a compromise between residual distortion after demodulation (a large window, or long integration time, is desired for low distortion) and the ability to cancel channel fading effects at high fading rates (a small window is desired to track rapid channel variations). Conveniently a window size WL of about 12 to 15 samples (at a sampling rate of 48.6 kHz) can be used.

In the receiver as described above, even though CCI SAT frequencies are removed by the filtering, it is still possible in the case of deep fading of the desired signal for the CCI to be stronger than the desired signal, so that a false capture of a CCI component instead of the desired signal is possible. To reduce the effects of this and to improve re-acquisition of the desired signal following such a deep fade, the receiver optionally further includes, as shown in FIG. 1, a false capture detector 40 for producing a false capture detection signal on the line 28 as indicated above. The detector 40 has an input connected to the output of the narrow-band SAT filter 32, and serves to monitor the signal energy at the output of the filter 32 over a short window period of for example 0.185 ms. The monitored energy, due to the SAT frequency of the desired signal appealing at the output of the filter 32, is usually greater than a predetermined threshold, in which case the detector 40 produces no false capture detection signal on the line 28 and the weight calculation unit 24 determines the weights $w_1$ and $w_2$ as described above.

In the event that the signal energy monitored by the detector 40 falls below the predetermined threshold, as for example may occur during a deep fade of the desired signal, the detector 40 produces the false capture detection signal on the line 28. In response to this signal, the weight calculation unit 24 determines the weights $w_1$ and $w_2$ so that the CCIC 14 operates as a switch simply to select and supply to the demodulator 22 via the line 20 that one of the signals on the lines 11 and 12 that has the greatest energy.

Figure 2:
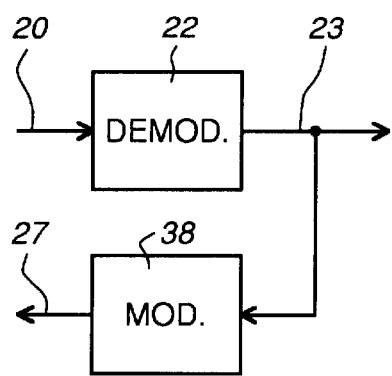
FIGS. 2 and 3 illustrate modified forms of parts of the receiver of FIG. 1.

The above description relates to a receiver for an AMPS system which carries voice signals with the allocated SAT frequency. Some of the same advantages as discussed above can be provided by a modified arrangement for a wideband data AMPS system, in which there are no SAT frequencies. Accordingly, in the modified arrangement the units 30, 32, 34, 36, and 40 described above are omitted, so that the modified arrangement has the form shown in FIG. 2, in which the demodulator 22 and modulator 38 serve for data demodulation and modulation respectively. In this modified arrangement, the data demodulation and remodulation reduces residual CCI and channel fading effects remaining after the weighted signal combining performed by the CCIC 14. In this arrangement, predetermined or known symbols in the demodulated data can be replaced at the input of the modulator by a local reference data signal.

Figure 3:
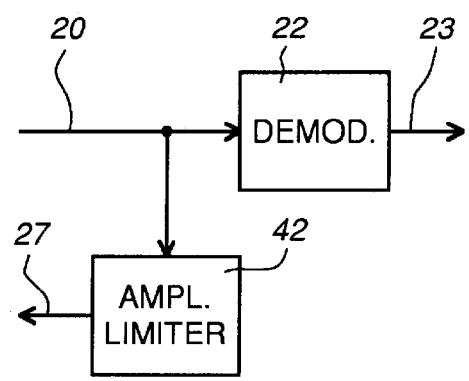

Another modified arrangement, which has the advantage that it can be used for either voice signals or data in an AMPS system, is illustrated in FIG. 3. In this modified arrangement the amplitude limiting function that is performed as described above by the series feedback coupling of the demodulator 22 and modulator 38 is provided directly by an amplitude limiter 42, having an input connected to the line 20 to receive the combined signal before demodulation, and an output providing the reference signal on the line 27. This modified arrangement also has the advantages that it is simple and it provides only a small signal delay, while it still accurately reproduces in the reference signal frequency variations and errors of the received desired signal (assuming that this is stronger than the CCI as discussed above).

Thus in each of these arrangements the reference signal is a derivation or recreation of the diversity combined signal on the line 20 with amplitude variations reduced by, the amplitude limiting or frequency demodulation and modulation, preferably with frequency variations of the desired signal substantially maintained.

Although the specific arrangements described above relate to only two diversity paths, it can be appreciated that the same arrangements can be easily extended for a greater number of diversity paths.

Numerous other modifications, variations, and adaptations may be made to the described embodiments without departing from the scope of the invention as defined in the claims.

What is claimed is:

1. A method of reducing co-channel interference in a receiver having at least two diversity paths each for producing a frequency modulated received signal, comprising the steps of:

determining weights for combining the received signals in dependence upon the received signals and a reference signal;

combining the received signals in accordance with the determined weights to produce a combined received signal;

demodulating the combined received signal to produce a demodulated signal;

filtering the demodulated signal to produce a filtered signal; and modulating the filtered signal to produce the reference signal.

2. A method as claimed in claim 1 wherein the step of filtering the demodulated signal comprises the steps of producing a first signal having reduced signal components in a predetermined frequency band, producing a second signal having signal components only in a narrow frequency band within the predetermined frequency band and identifying a desired received signal, and combining the first and second signals to produce the filtered signal.

3. A method as claimed in claim 2 wherein the step of producing the second signal comprises frequency tracking said signal components identifying the desired received signal.

4. A method as claimed in claim 3 and including the step of monitoring energy of said signal components identifying the desired received signal.

5. A method as claimed in claim 3 wherein the receiver comprises an AMPS (Advanced Mobile Phone System) receiver.

6. Apparatus comprising:

a receiver having at least two diversity paths each for producing a frequency modulated received signal;

a weight calculation unit for determining weights for combining the received signals in dependence upon the received signals and a reference signal;

a signal combiner for combining the received signals in accordance with the determined weights to produce a combined received signal;

a demodulator for demodulating the combined received signal to produce a demodulated signal; and means for reducing amplitude variations of the combined received signal to produce the reference signal;

wherein the means for reducing amplitude variations of the combined received signal to produce the reference signal comprises a filter for filtering the demodulated signal to produce a filtered signal, and a modulator for frequency modulating the filtered signal to produce the reference signal.

7. Apparatus as claimed in claim 6 wherein the filter comprises a first filter for producing a first signal having reduced signal components in a predetermined frequency band, a second filter for producing a second signal having signal components only in a narrow frequency band within the predetermined frequency band and identifying a desired received signal, and a combiner for combining the first and second signals to produce the filtered signal.

8. Apparatus as claimed in claim 7 wherein the second filter comprises a frequency tracking unit for frequency tracking said signal components identifying the desired received signal.

9. Apparatus as claimed in claim 8 and comprising a unit for monitoring energy of said signal components identifying the desired received signal.

10. Apparatus as claimed in claim 7 and comprising a unit for monitoring energy of said signal components identifying the desired received signal.

* * * * *